Figure 1:
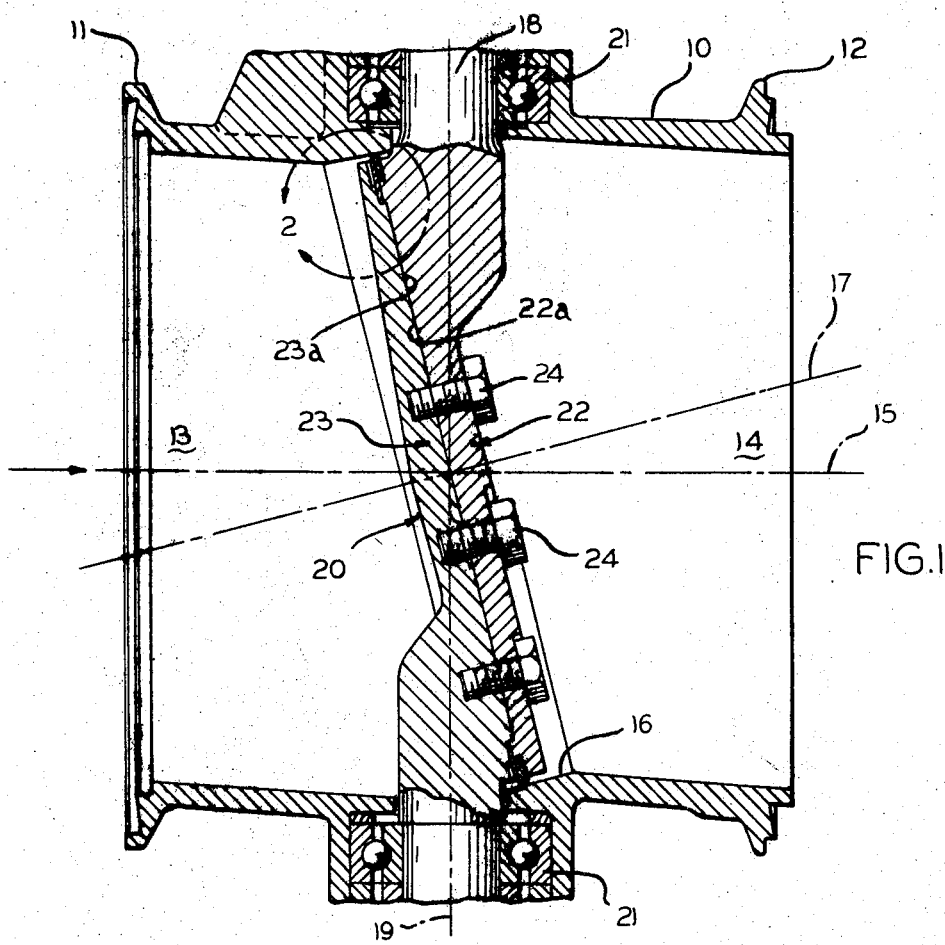

United States Patent

[11] 3,578,287

| [72] | Inventors | Paul G. Salerno<br>Glenview;<br>Steven J. Wilson, Chicago, Ill. |
|---|---|---|
| [21] | Appl. No. | 773,458 |
| [22] | Filed | Nov. 5, 1968 |
| [45] | Patented | May 11, 1971 |
| [73] | Assignee | Vapor Corporation<br>Chicago, Ill. |

[54] BUTTERFLY VALVE
5 Claims, 2 Drawing Figs.

| [52] | U.S. Cl. | 251/306 |
|---|---|---|
| [51] | Int. Cl. | F16k 1/228 |
| [50] | Field of Search | 251/173, 305—308 |

[56] References Cited
UNITED STATES PATENTS

| 2,883,149 | 4/1959 | Fiorentini | 251/306 |
|---|---|---|---|
| 3,059,897 | 10/1962 | Jensen | 251/306 |
| 3,127,182 | 3/1964 | Wardleigh | 251/306X |
| 3,282,555 | 11/1966 | Mallonee et al. | 251/306X |

*Primary Examiner*—Henry T. Klinksiek
*Attorney*—Norman Aon Witt

ABSTRACT: Butterfly valve for controlling fluid flow in conduits, and including a butterfly coacting with a seating bore in a casing having a peripherally mounted, solid sealing ring for engagement with a seating bore, wherein the sealing ring is mounted on the butterfly for radial movement to conform to the seating bore when the valve is closed.

Patented May 11, 1971 3,578,287

INVENTORS
PAUL G. SALERNO
STEVEN J. WILSON
BY
ATTORNEY

BUTTERFLY VALVE

This invention relates in general to a butterfly valve for controlling fluid flow in conduits and especially hot, high-pressure fluid flow, and more particularly to a butterfly sealing ring and arrangement for a butterfly valve for effecting a tight seal in closed and seated position.

Heretofore, sealing rings in butterfly valves were provided with gaps to allow assembly on solid one-piece butterflies. Such gaps allowed excessive leakage and were undesirable for certain applications.

The present invention overcomes the leakage problem of heretofore known butterfly valves in providing a solid or continuous ring without a gap that is employed on a sectional butterfly, and that will effect a better seal when closed. The solid sealing ring of the invention is mounted on the butterfly, so that it can experience radial movement when in closed position and thereby define a tight seal.

It is therefore an object of the present invention to provide a new and improved butterfly valve that will effectively seal against hot, high-pressure fluid flow to thereby effectively control fluid flow in conduits or pipes.

A further object of this invention is in the provision of a solid sealing ring for a butterfly valve that effects a tight seal when in closed position.

Still a further object of this invention is in the provision of a butterfly valve having a solid sealing ring and means for mounting the ring to allow the ring to define radially while still effecting a tight seal.

Another object of this invention is to provide a butterfly valve having a solid sealing ring and a butterfly structure that facilitates assembly and disassembly for maintenance, and which may be inexpensively manufactured by not requiring extremely close tolerance.

Figure 2:
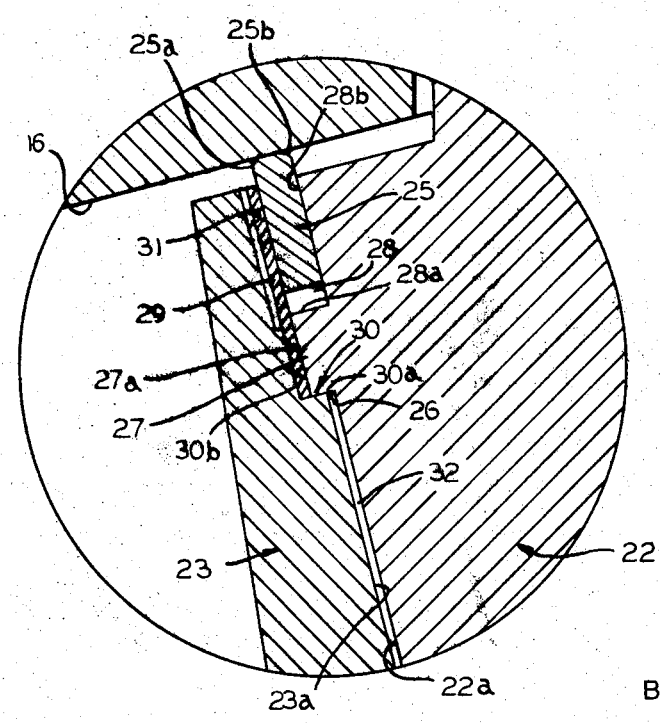

Other objects, features and advantages of the invention will be apparent from the following detailed disclosure, taken in conjunction with the accompanying sheet of drawing, wherein like reference numerals refer to like parts, in which:

FIG. 1 is a longitudinal, sectional view of the butterfly valve according to the present invention, with some parts broken away for purposes of clarity, and illustrating the butterfly in closed position; and FIG. 2 is a greatly enlarged, detail sectional view of the circle 2 of FIG. 1, illustrating the detailed structure of the mounting for the solid sealing ring.

Referring now to the drawings, the illustrated butterfly valve of the present invention includes an annular or vertically, cylindrically shaped casing 10 having an upstream end flange 11 and a downstream end flange 12 at the other end for connecting the casing to suitable pipe or conduit through which a fluid may flow. It should be appreciated that the end flanges may take any suitable form. An inlet 13 is defined at one end of the casing, while an outlet 14 is defined at the other end thereof. The centerline or axis of the casing is represented by the dotted line 15. An internal cylindrical valve-seating bore 16 is provided in the casing and the centerline or axis thereof, as represented by the dotted line 17, forms as acute angle with respect to the centerline 15 of the casing. A transversely extending shaft 18 is disposed at the center of the casing in such a manner that its axis as shown by the dotted line 19 intersects the intersection of the bore axis 17 and casing axis 15. The shaft extends at right angles to the casing centerline. As can be appreciated, the butterfly or valve disc 20 is mounted on the shaft 18 for rotation therewith, and disposed within the casing along a radial plane that extends perpendicular to the bore axis 17, and at an angle of slightly less than 90° relative the centerline 15. Thus, the shaft 18 effectively passes through the valve disc or butterfly 20 without interrupting the periphery of the butterfly, so that it is possible to have a continuous and solid sealing ring mounted on the periphery of the valve disc in accordance with the invention. However, it should be recognized that the valve bore axil 17 may be coaxial with the casing axis 15, and in that case the butterfly axis of rotation would be at an angle of less than 90° relative a perpendicular plane passing through the casing axis 15.

In order to facilitate rotation of the butterfly and shaft, the opposite shaft ends are mounted in bearings 21 held by the casing 10. Any suitable drive may be employed for attachment to the shaft 18 to cause rotation of the butterfly within the casing. For example, a wrench-receiving end may be formed at one end of the shaft for applying a wrench thereto that enables ease of rotation of the butterfly.

The butterfly 20 is sectional and includes a downstream half or section 22 and an upstream half or section 23. Centrally, the sectional halves are provided respectively with flat surfaces 22a and 23a that almost but not quite abut when the halves are assembled. Any number of fasteners such as capscrews 24 may be provided in order to secure the two halves tightly together. It may be further noted that the downstream half 22 is integral with the shaft 18 at its upper end, while the upstream half 23 is integral with the shaft 18 at its lower end. Therefore, the shaft 18 as constructed is not separate from the butterfly, but essentially integral therewith, and it may be said that the butterfly halves themselves form a part of the shaft, especially at the center portion of the casing.

In order to provide a tight seal with the bore 16, a solid or continuous sealing ring 25 is mounted on the periphery of the butterfly 20 in such a manner that it may deform radially to conform to small deformities in the bore 16 and to compensate for tolerances in manufacture. Effectively, the butterfly halves or sections 22 and 23 hold the sealing ring 25 in position on the periphery in such a manner as to permit the deformities.

The face 22a of the downstream butterfly half 22 is formed to define at the central area a shallow blind bore 26. Concentrically and adjacent thereto is an annular ridge 27 defining an outer face 27a, while exteriorly and concentrically of the ridge an annular notched area 28 is formed that includes a bottom wall 28a extending parallel to the axis of the butterfly and a radial wall 28b that extends to the periphery of the butterfly half. The notch 28 receives the sealing ring 25, but is of an axial depth slightly less than the axial thickness of the ring. MOreover, the inside diameter of the ring is larger than the diameter of the bottom wall 28a to facilitate radial movement of the ring in its mounted position.

The sealing ring 25 is held in place on the step or notch 28 by an annular thin shim seal or washer 29 that is carried on the butterfly half 23. Being thin, the washer exhibits flexibility between its inner and outer concentric edges. An annular shoulder 30 is formed on the butterfly half 23 and includes a cylindrical wall 30a and a radial wall 30b. The cylindrical wall 30a mates with the blind bore 26 of the downstream half 22 to guide assembly of the halves. Sandwiched between the radial wall 30b and the radial wall 27a is the inner end of the shim seal 29, so that it is firmly anchored between the butterfly halves. A recess or relief 31 is provided on the face of the upstream half 23 to the periphery thereof to allow limited movement of the outer end portion of the shim seal 29, thereby permitting a limited radial movement of the solid sealing ring 25. In assembled relationship, inasmuch as the sealing ring 25 is slightly wider than the step 28 formed in the downstream butterfly half 22, the relatively thin shim seal 29 deforms slightly while holding the sealing ring firmly against the radial wall 28b of the downstream butterfly half 22. However, the sealing ring 25 is still able to deform and move radially between the shim seal and the downstream butterfly half to permit conformity between the sealing ring and small deformities formed in the seating bore 16.

The outer periphery of the sealing ring 25 is rounded at 25a and 25b to prevent galling of the seating bore 16, during relative slight engagement between the ring and bore, thereby ensuring a tight seal when the ring is in closed position.

The sealing ring 25 is provided with an outside diameter that is slightly larger than the inside diameter of the seating bore 16. Accordingly, when the sealing ring and butterfly are in closed position and the ring is sealing tight against the bore, the ring is situated at a slight angle to the centerline 17 of the bore, and in this position the sealing ring forms an ellipse when viewed from the centerline of the butterfly. This deformity and somewhat elliptical shape is permitted since the sealing ring 25 can move slightly in a radial direction relative the centerline of the butterfly, because the upstream side of the shim seal 29 is not bottomed on the upstream face of the upstream butterfly half 23 at the area that engages the sealing ring 25. In order to tightly anchor the shim seal 29 between the butterfly halves or sections, the halves are made of such a size that the faces 22a and 23a do not fully abut or bottom, there being a slight gap or space 32 when the halves are assembled.

It can be appreciated that a replacement ring may be substituted for a wornout ring by disassembly of the butterfly halves.

From the foregoing, it will be recognized that the butterfly valve of the present invention provides a construction utilizing a solid sealing ring without a gap that assures a better seal and prevents excessive leakage through the valve, while also providing a structure that will not require extremely close tolerances in manufacture.

It will be understood that modifications and variations may be effected without departing from the scope of the novel concepts of the present invention.

We claim:

1. A butterfly valve comprising a generally cylindrical casing having an inlet at one end and an outlet at the other end, a cylindrical seating bore within the casing, shaft means supported by the casing, and a butterfly mounted on said shaft in position to be turned into concentric relation with said valve-seating bore when said valve is closed, said butterfly including a peripheral ring groove and a continuous sealing ring therein having an outer diameter slightly larger than the diameter of the seating bore and an inner diameter larger than the base of the groove, means mounting said ring in said groove to permit movement of the ring radially in both directions and axially in one direction.

2. A butterfly valve as defined in claim 1, wherein said butterfly is sectional and includes upstream and downstream sections, a step at the periphery of the downstream section receiving said ring, an annular shim seal clamped between said sections at its inner end leaving its outer end free and arranged to bear against said ring to hold same on the step, and a relief on said upstream section aligned with the outer end of the shim seal to permit flexing movement of said ring.

3. A butterfly valve as defined in claim 2, wherein the axial width of the ring is slightly larger than the axial width of the step.

4. A butterfly valve as defined in claim 3, wherein the outer periphery of the ring is rounded to prevent galling between the ring and bore.

5. A butterfly valve comprising a generally cylindrical casing having an inlet at one end and an outlet at the other end, a cylindrical seating bore within the casing, a shaft disposed through the casing at an angle to the axis of the casing and a butterfly mounted on said shaft in position to be turned into concentric relation with said valve-seating bore when said valve is closed, said butterfly being sectional and including an upstream section and a downstream section, an annular notch at the outer periphery of the downstream section defined by axial and radial walls, a solid sealing ring received on said notch having an inside diameter larger than the diameter at the axial wall and an outside diameter slightly larger than the diameter of said seating bore, an annular washer clamped at its inner concentric edge between coacting clamping surfaces on said butterfly sections, said washer extending to the periphery of the sections and bearing against the upstream side of said ring to hold same on the notch and against the notch radial wall, and an annular recess on the upstream section adjacent the upstream side of the washer at the outer concentric edge thereof and opposite the ring to permit axial movement of the outer concentric washer edge.